United States Patent [19]
Tomita et al.

[11] Patent Number: 5,550,623
[45] Date of Patent: Aug. 27, 1996

[54] DIGITAL COPYING MACHINE HAVING SELECTIVE PAPER FEED BASED ON COPY PRODUCTIVITY

[75] Inventors: Kan Tomita; Toshihiko Majima, both of Tokyo; Toshiya Tagawa; Hiroyasu Sumida, both of Ichikawa, all of Japan

[73] Assignee: Ricoh Company, Ltd., Tokyo, Japan

[21] Appl. No.: 460,355

[22] Filed: Jun. 2, 1995

[30] Foreign Application Priority Data

Jun. 15, 1994 [JP] Japan ................................ 6-156822
Mar. 30, 1995 [JP] Japan ................................ 7-074072

[51] Int. Cl.⁶ ........................................... G03G 21/00
[52] U.S. Cl. ..................... 355/311; 355/208; 355/309
[58] Field of Search ............................... 355/200, 202, 355/204, 208, 210, 243, 308, 309, 311; 271/9.01, 9.05, 9.06

[56] References Cited

U.S. PATENT DOCUMENTS

| | | | |
|---|---|---|---|
| 5,221,951 | 6/1993 | Saksmoto | 355/311 |
| 5,237,379 | 8/1993 | Sklut et al. | 355/311 |
| 5,287,159 | 2/1994 | Sakakibara | 355/311 |
| 5,289,236 | 2/1994 | Yoshino | 355/243 |
| 5,420,669 | 5/1995 | Imada | 355/208 |

FOREIGN PATENT DOCUMENTS

| | | |
|---|---|---|
| 1-184157 | 7/1989 | Japan . |
| 6-99627 | 4/1994 | Japan . |

*Primary Examiner*—Sandra L. Brase
*Attorney, Agent, or Firm*—Lowe, Price, LeBlanc & Becker

[57] ABSTRACT

In a digital copier of a type having plural paper trays for storing recording paper of different sizes and orientations, an automatic paper selection mechanism selects paper from a tray that produces the shortest time required to make a prescribed number of copies. Paper tray selection is based on the size of the original, magnification, paper tray position and time required to electronically rotate original image data for recording on a transversely oriented sheet of paper. These factors are used to compute a reference value that is compared to the number of copies of the original image to be made. In response, the selection mechanism will determine whether to copy the image to a longitudinal or transverse sheet on one of the trays, and rotate the image by 90° if the tranverse sheet is selected.

23 Claims, 5 Drawing Sheets

5,550,623

DIGITAL COPYING MACHINE HAVING SELECTIVE PAPER FEED BASED ON COPY PRODUCTIVITY

TECHNICAL FIELD

This invention relates to a digital copying machine having an automatic paper selection function, and more particularly a digital copying machine capable of rotating read image information before recording on paper, for improvement of copy productivity.

BACKGROUND ART

As one type of conventional digital copying machine having an automatic paper selection function, there has been provided a digital copying machine which is arranged so that, when the original is set longitudinally (the longitudinal direction corresponds to the transported and scanned direction), and recording paper of a size based on the original size and magnification for copying is set on one or more paper feeding trays in a laterally fed state (wherein the transported direction of the recording paper coincides with its lateral direction), the laterally set recording paper is always selected and the original image information is rotated by 90 degrees before being outputted to the recording paper. This rotation of the image onto a laterally positioned sheet of paper reduces the time taken for recording the image information for improved copy productivity.

According to the above-mentioned prior art, however, when the original is set longitudinally and the corresponding recording paper set in the laterally fed state is present, because the laterally set recording paper is always selected, when the number of copies to be made repeatedly is small or the corresponding recording paper is set laterally on a paper feeding tray which has the longest transport distance so that making of the first copy is slow, a problem arises in that copy productivity is not always improved. Productivity in fact can sometimes actually be lowered as compared with the use of longitudinally fed recording paper because of the time required for the image rotating process and the difference in the time needed for making the first copy.

DISCLOSURE OF THE INVENTION

The present invention has been developed in order to eliminate the above-described problem, and it is an object of this invention to select recording paper so that the job-finishing time is shortened so as to improve productivity independently of whether or not image rotation is to be performed.

In order to achieve the above-described and other objects of the invention, a copying machine comprises a scanner for reading image information from an original image, an image memory for storing digital image data, an image processing section coupled to the memory for processing the image information and producing therefrom digital image data, paper feeding means comprising plural paper trays for storing recording paper of various sizes and rotational orientations, an automatic paper selection means that computes a reference value on the basis at least of processing times for at least one prescribed image conversion process and transport of paper from corresponding trays of the paper feeding means and selects a tray from among the plurality of paper trays, and an image forming means for forming an image corresponding to the digital image data on recording paper from the selected tray.

For example, the image processing may include image size magnification. As another example, certain of the trays contain recording paper oriented in same direction as a preset direction, and at least one other tray contains recording paper having an orientation that is rotated with respect to the preset direction, and image processing comprises rotation of image data stored in the image memory.

In accordance with an aspect of the invention, there is included a means for determining the number of copies of an original image to be made, and wherein the automatic paper selection means selects a tray in dependence on the reference value and the determined number of copies. In a particular embodiment, a stored combinatorial table based on respective paper trays and paper orientations is provided, accessible by the automatic paper selection means for deriving the reference value.

In accordance with one embodiment of the invention, the reference value is varied in accordance with image size magnification between original and recorded images or with recording paper size. In another embodiment, the reference value has a first value or a second value depending upon transport distance from a tray of recording paper of the preset orientation compared to transport distance from a tray of recording paper of orientation different from the preset orientation. As another possibility the reference value may be independent of recording paper orientation among the trays. In other embodiments, the reference value is dependent on original rotational orientation, recording paper size or transport time, or tray selection is made simply in accordance with the number of copies to be made.

BEST MODE FOR CARRYING OUT THE INVENTION

Figure 1:
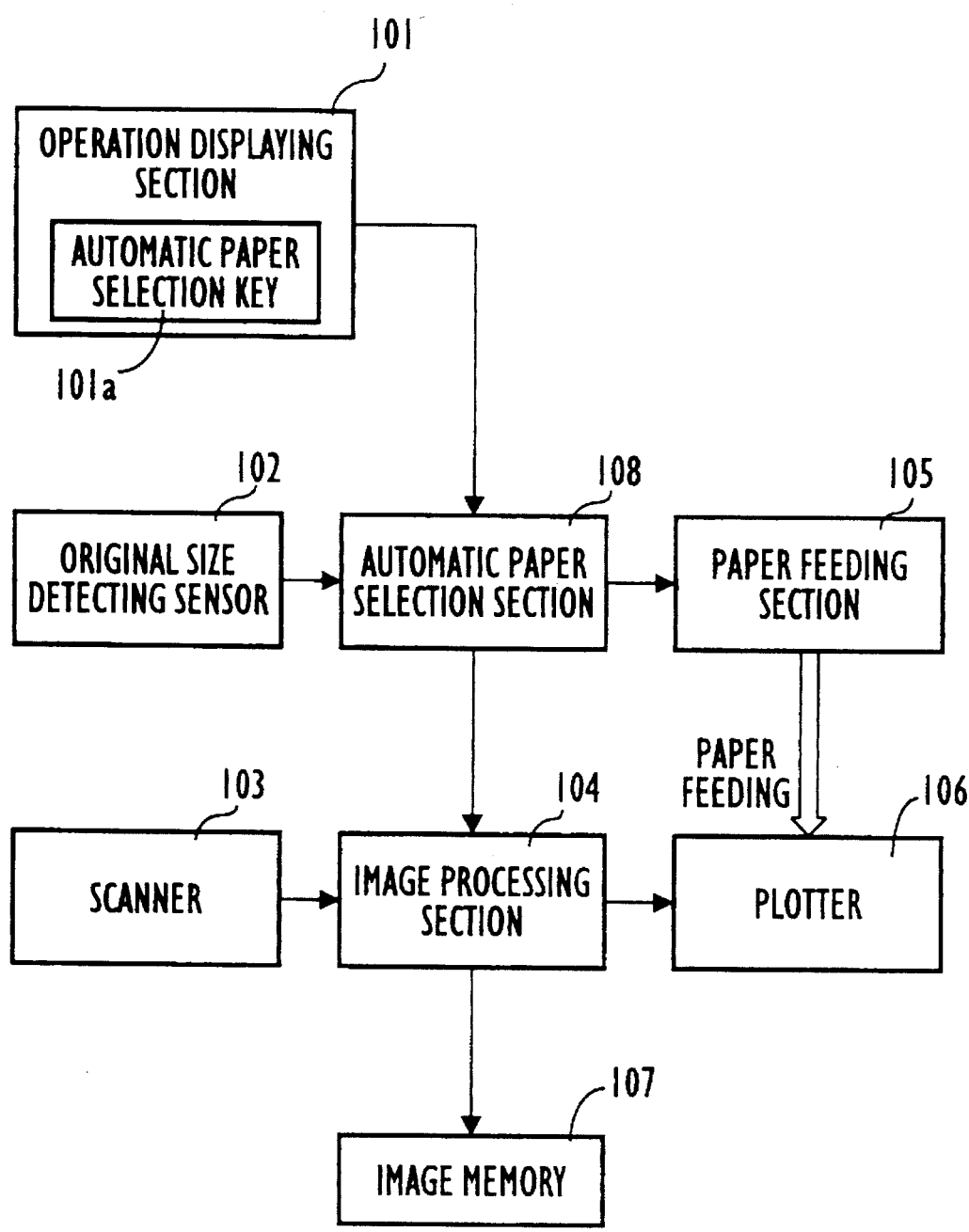
FIG. 1 is a block diagram showing an arrangement of a digital copying machine according to the invention.

An arrangement of a digital copying machine, which is common to all embodiments of the invention, will be described with reference to FIGS. 1 and 2. FIG. 1 is a block diagram showing an arrangement of a digital copying machine equipped with an operation display section 101, including an automatic paper selection key 101a for designating whether or not to use the automatic paper selection function, for performing a display of various messages and various key inputs such as designations of the number of copies to be made and copy magnification, an original size detecting sensor 102 for detecting the set direction (orientation) and size of the original, a scanner 103 for reading image information from the original, an image processing section 104 for performing an image process on the image information read from the scanner 103, a paper feeding section 105, having plural paper feeding trays or steps, for feeding recording paper, a plotter 106 for inputting the processed image information from the image processing section 104 to form an image on recording paper fed from the paper feeding section 105, an image memory 107 for allowing storage of image information corresponding to more than one sheet of recording paper having the largest copy size, and an automatic paper selection section 108 for, when the automatic paper selection function has been selected by the automatic paper selection key 101a, determining the recording paper size on the basis of the original size and magnification so as to select one of the plural paper feeding trays of the paper feeding section 105 where the most suitable recording paper is placed.

Here, the image processing section 104 also serves as an image information rotating means to rotate the image information by 90 degrees by using the image memory 107.

In addition, when recording paper of a size determined on the basis of the original size and the magnification are present on different trays of the plural paper feeding trays of the paper feeding section 105, and the recording paper is set longitudinally or set laterally with its set direction being rotated by 90 degrees, the automatic paper selection section 108, on the basis of a comparison between the number of copies to be made and a predetermined reference value, selects either recording paper different from the original in the set direction with the image information being rotated by 90 degrees or the recording paper coincident with the original in the set direction, and in the former case controls the image processing section 104 to rotate the image information by 90 degrees.

Figure 2:
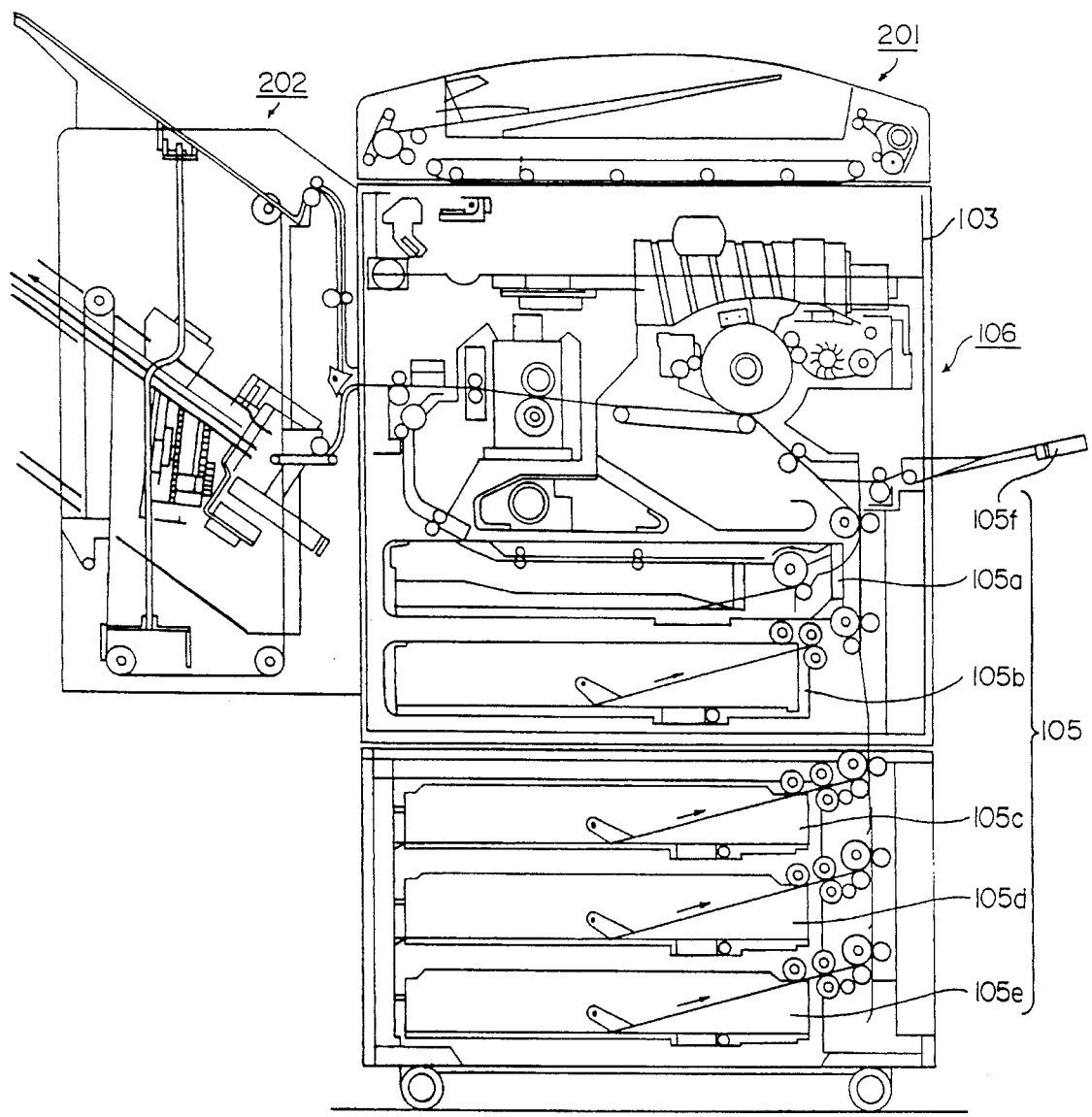
FIG. 2 is an illustration of a schematic arrangement of a digital copying machine according to the invention.

FIG. 2 shows a schematic arrangement of a digital copying machine according to this aspect of the invention. In the same Figure, numeral 201 represents an ADF (automatic draft feeder) for conveying the original up to a predetermined reading position on the scanner 103 and 202 designates a sorter stapler. Further, as illustrated in the Figure, there are also provided the scanner 103, plotter 106, and paper feeding section 105.

The paper feeding section 105 has four paper feeding trays: a first paper feeding tray 105b, a second paper feeding tray 105c, a third paper feeding tray 105d, and a fourth paper feeding tray 105e. In addition, although 105a denotes a double-faced unit, in cases where a paper feeding tray is placed instead of the double-faced unit, 105a becomes the first paper feeding tray, and accordingly, 105b is used as the second paper feeding tray, 105c is used to be the third paper feeding tray, 105d assumes the fourth paper feeding tray, and 105e takes the fifth paper feeding tray. Moreover, 105f depicts a manual paper-feeding tray.

Here, in the digital copying machine illustrated in FIG. 2, when the first paper feeding tray 105b, second paper feeding tray 105c, third paper feeding tray 105d, and fourth paper feeding tray 105e are mounted as four paper feeding trays, this state is called 4-tray paper feed, and in this case the process linear velocity is made to be 200 mm/sec. On the other hand, when a paper feeding tray is mounted in place of the double-faced unit to provide five paper feeding trays (105a, 105b, 105c, 105d, and 105e assume the first paper feeding tray, second paper feeding tray, third paper feeding tray, fourth paper feeding tray, and fifth paper feeding tray, respectively), this state is called 5-tray paper feed, and in this case the process linear velocity is set to be 150 mm/sec.

Under the above-described arrangement, regarding the process executed by the automatic paper selection section 108 of the digital copying machine according to a first embodiment, a description will be made in order of (1) an operation for the automatic paper selection process in the first embodiment, (2) a concrete example as to a selection procedure, (3) the relationship between the number of repeatedly made copies and productivity, and (4) a concrete calculation example of the reference value.

Operation of the Automatic Paper Selection Process in the First Embodiment

First, a description will be made in terms of an outline of the basic operation. In the digital copying machine according to this embodiment, it is possible that image information is rotated by 90 degrees with respect to sizes below A4 by means of the image processing section 104 and image memory 107 (which will be referred hereinafter to as longitudinal-lateral change). Accordingly, when the most suitable recording paper is set longitudinally and laterally on some trays of the paper feeding section 105, basically it is possible to select either size of recording paper for copying. However, due to the rotation there is a problem which arises in terms of compatibility with other functions (for instance, the function of the sorter stapler 202), and there is a possibility of providing a result that is not intended by the users. Thus, basically the paper feeding tray containing the recording paper, whose set direction is coincident with the direction of the most suitable recording paper selected automatically, is given priority. In addition, in cases where rotation may produce a problem when, for example, the sorter stapler 202 is designated, rotation of the automatic paper selection section 108 is inhibited.

On the other hand, in cases where sheets of recording paper are set longitudinally and laterally without any problem due to the rotation, the laterally set recording paper is given priority. However, in rotational operation, since the copying operation starts after image information is first, and only once, stored in the image memory 107 and hence the time required for making the first copy is longer than that for the others, the selection of the longitudinally set recording paper (no rotational operation) may be selected based upon a prescribed condition, namely a comparison between the number of copies to be made and a predetermined reference value, as will be described below.

Secondly, operation of the automatic paper selection process by the automatic paper selection section 108 will be described with reference to flow charts of FIGS. 3 and 4. A decision is initially made in terms of whether or not the automatic paper selection is designated through the automatic paper selection key 101a (S301). If not designated, using the operation display section 101, copying is effected with the paper feeding tray which is being selected currently (S302).

If the automatic paper selection is designated, a decision is made in terms of whether longitudinal-lateral rotation is appropriate or not, in other words, whether or not the function of the sorter stapler 202 is designated, which causes a problem due to rotation (S303). If the longitudinal-lateral rotation is not appropriate, the operation selects the most suitable paper feeding tray, which can ensure the image, on the basis of the original size, set direction of the original and magnification, before accomplishing the copy (S304). Here, although a detailed description will be omitted, the process of the S304 is the same as conventional automatic paper selection control. When longitudinal-lateral rotation is appropriate, there is executed a selection process of the paper feeding trays which is important for providing high productivity (S305)..

Figure 4:
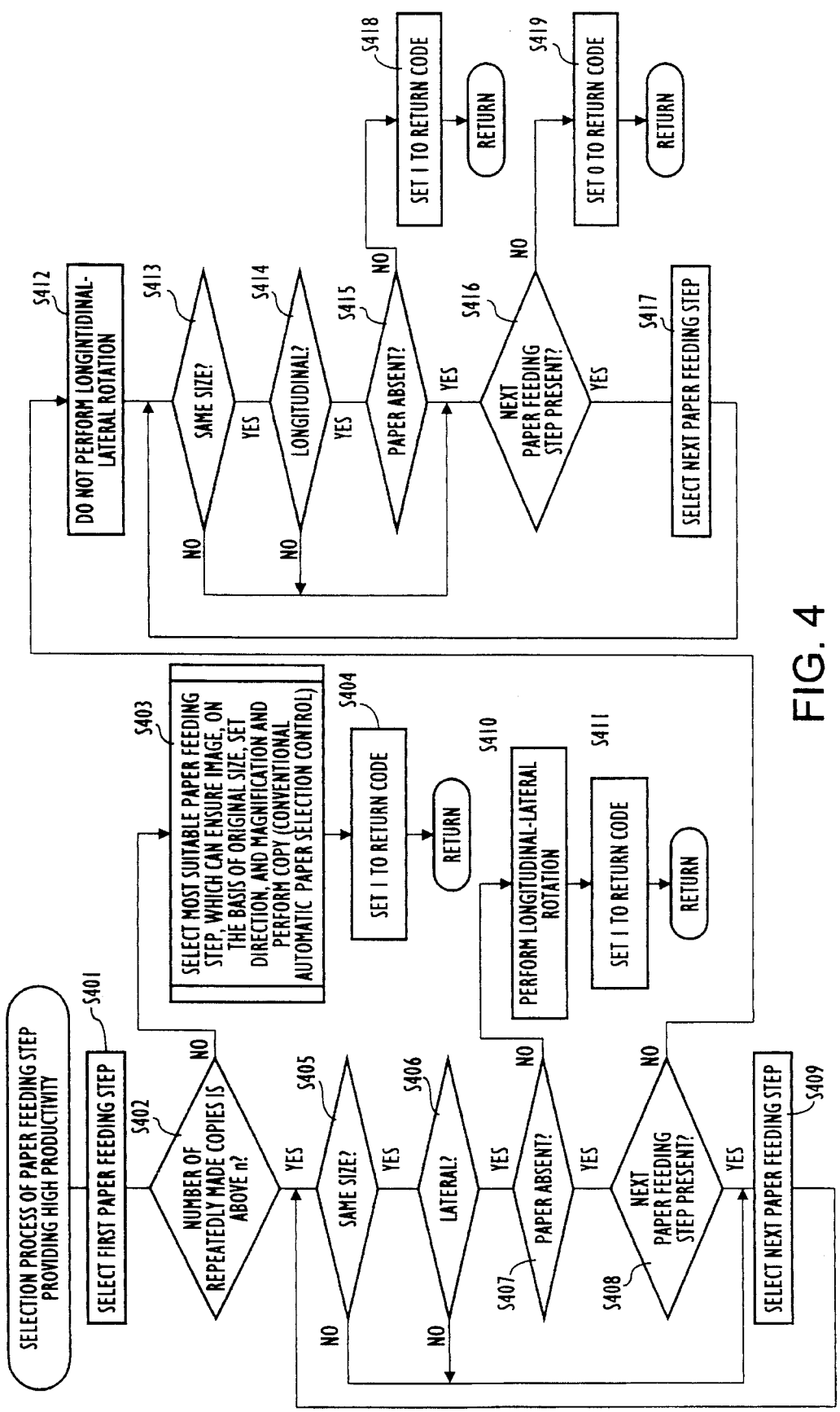
FIG. 4 is a flow chart showing a selection process, which is a main part of this invention, for a paper feeding step providing a high productivity.

FIG. 4 is an illustration of a flow chart for the selection process of the paper feeding trays. The first paper feeding tray is initially selected (S401), then followed by deciding whether or not the number of repeatedly made copies set through the operation display section 101 is above a reference value n (S402). At this time, if the number of repeatedly made copies<n, the operation selects the most suitable paper feeding tray, which can ensure the image, on the basis of the original size, original-set direction and magnification (S403), and then a return code is set to 1 (S404), before the operational flow returns to step S306.

If the number of repeatedly made copies≧n, when the recording paper on the selected paper feeding tray is identical in size to the most suitable recording paper and set laterally (S405, S406), a decision is made in terms of whether the recording paper is present on the selected paper feeding tray or not (that is, whether or not the recording paper is used up) (S407). If there is no paper, the operation advances to step S408.

On the other hand, in cases where the recording paper on the selected paper feeding tray is the same as the most suitable recording paper in size, or in the case that it is not set laterally, the operation goes to S408 so as to decide whether the next paper feeding tray exists or not. If existing, the next paper feeding tray is selected (S409), and on the other hand, if not, the operation proceeds to step S412.

Figure 3:
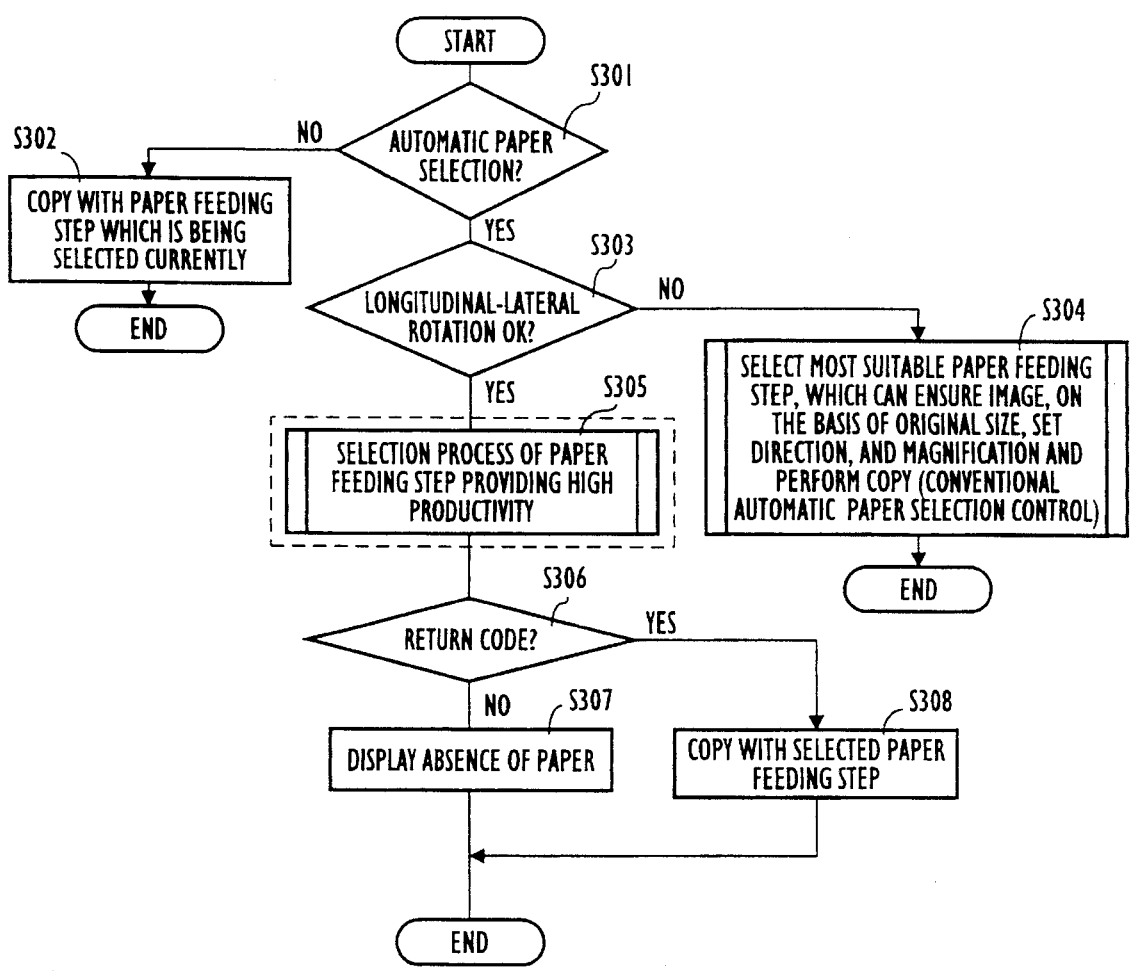
FIG. 3 is a flow chart illustrating an automatic paper selection process in an automatic paper selection section.

Furthermore, if paper exists, the operation supplies a command to the image processing section 104 to perform longitudinal-lateral rotation of the image information (S410), and then sets the return code to 1 before the operational flow returns to step S306 in FIG. 3 (S411).

A step S412 is executed in order to supply the image processing section 104 with a command indicative of no longitudinal-lateral rotation of the image information. Subsequently, when the recording paper on the selected paper feeding tray has the same size as the most suitable recording paper and is set longitudinally (S413, S414), a decision is made as to whether or not recording paper is present on the selected paper feeding tray (whether the tray has run out of the paper or not) (S415). If there is no paper, the operation proceeds to step S416.

On the other hand, if recording paper on the selected paper feeding tray does not have the same size as the most suitable recording paper, or if it is not set longitudinally, the operation goes to a step S416 so as to check to see if the next paper feeding tray exists or not. If existing, the next paper feeding tray is selected (S417), and if absent, the operation sets 1 to the return code to 1 and then returns to step S306 (S419).

Furthermore, in the case of the presence of the recording paper, the operation sets the return code to 1 before returning to step S306 in FIG. 3 (S418).

Following this, step S306 in FIG. 3 is executed in order to check whether the return code is 1 or not. Here, the return code of 1 is indicative of the fact that the corresponding paper feeding tray is present, and the return code of 0 is representative of the fact that the corresponding paper feeding tray is absent (that is, the paper is absent).

Accordingly, when the return code is not 1, the operation display section 101 displays "no paper," and then the operation is ended (S307). On the other hand, when the return code is 1, copying is carried out with the selected paper feeding tray (S308).

Concrete Example of Selection Procedure

Subsequently, a description will be made in terms of a concrete example of the selection procedure on the above-mentioned (1) automatic paper selection process.

The Original Is Set Laterally

In cases where the most suitable recording paper selected automatically is set on plural paper feeding trays, the paper feeding tray for storing recording paper laterally is selected which provides the shortest transport distance and which contains recording paper. If recording paper is absent, a paper feeding tray is selected which provides the transport distance next to the shortest and which contains recording paper. Further, if all the recording paper which is to have the corresponding size and is to be set laterally is absent, according to the same procedure there is again selected the paper feeding tray storing the same size recording paper longitudinally which provides the shortest transport distance and actually contains recording paper. In case that the recording paper having the corresponding size and being set longitudinally or laterally is absent, a selection is made for the paper feeding tray having the shortest transport distance as well as containing recording paper set laterally, and the paper absence is displayed.

The Original Is Set Longitudinally

When the original is set longitudinally and the number of repeatedly made copies is above n, since laterally set recording paper basically provides higher productivity, the most suitable recording paper selected automatically is given priority. In other words, selected is the paper feeding tray which provides the shortest transport distance and which contains the recording paper, and then rotation of image information is carried out. If recording paper is absent, the paper feeding tray is selected which provides the transport distance next to the shortest which contains recording paper. If all the recording paper having the corresponding size and set laterally is absent, according to the same procedure there is again selected the paper feeding tray which is for the same size recording paper set longitudinally and which provides the shortest transport distance and actually contains recording paper. In this case, the image information does not involve rotation. If the recording paper having the same size and set longitudinally or laterally is absent, a selection is made for the paper feeding tray which contains recording paper set laterally and which offers the shortest transport distance, and then the absence of recording paper is displayed.

Meanwhile, when the original is set longitudinally and the number of repeatedly made copies is below the reference value n, since the image information is stored in the image memory 107 for the rotational operation and the productivity is lowered accordingly, priority is given to recording paper having the most suitable size selected automatically. That is, a selection is made for the paper feeding tray which provides the shortest transport distance and which contains recording paper set longitudinally. If the recording paper is absent, a selection is further made for the paper feeding tray which offers the transport distance next to the shortest and which contains recording paper. If all the recording paper having the corresponding size and set longitudinally is absent, a selection is again made for the paper feeding tray offering the shortest transport distance in addition to containing the same size recording paper set laterally. In this case, the image information involves rotation. In case that there is no recording paper having the corresponding size and set longitudinally or laterally, a selection is made in terms of the paper feeding tray which provides the shortest transport distance which retains recording paper having the corresponding size set longitudinally, before a display is made which is indicative of the absence of recording paper.

Relationship Between the Number of Repeatedly Made Copies and Productivity

In cases where the original is set longitudinally and the most suitably sized recording papers are set longitudinally and laterally, from the viewpoint of CPM productivity becomes higher as laterally set recording paper is selected. However, as described above, for rotation of the image information, the read image information is first stored in the image memory 107 before the copying operation starts. Thus, from the viewpoint of the time taken for the first copy, productivity can become higher when longitudinally set recording paper is selected without image rotation.

Basically CPM depends on the set direction (longitudinally, laterally) of the recording paper and the size of the recording paper, and the time taken for the first copy depends on the transport distance from the paper feeding tray.

The following are typical combination examples.

Comparison in Productivity Between Recording Paper Set Longitudinally on First Paper Feeding Tray and Recording Paper Set Laterally on Fifth Paper Feeding Tray In the case of selection of the first paper feeding tray, the transporting time (Tf1) from the first paper feeding tray to the resist+CPM (Tt) of the longitudinally set recording paper×the number of repeatedly made copies (m−1)=the time (T1) required for the job to finish. In the meantime, in the case of selection of the fifth paper feeding tray, the transporting time (Tf5) from the fifth paper feeding tray to the resist+the scanning (rotating) time (Ts)+CPM (Ty) of the laterally set recording paper×the number of repeatedly made copies (m−1)=the time (T5) required for the job finish. Here, (Tf1<Tf5, Tt>Ty).

Accordingly, when T1>T5, theoretically the selection of the laterally set recording paper (the fifth paper feeding tray) results in higher productivity. In this case, when the number of repeatedly made copies is 1, it is obvious that productivity increases as paper feed is accomplished from the first paper feeding tray without rotation. On the other hand, when the number of repeatedly made copies is m, due to Tt>Ty, there may be a possibility that productivity becomes higher as laterally set recording paper is fed from the fifth paper feeding tray with rotation.

Comparison in Productivity Between Recording Paper Set Laterally on First Paper Feeding Tray and Recording Paper Set Longitudinally on Fifth Paper Feeding Tray In the case of selection of the first paper feeding tray, the transporting time (Tf1) from the first paper feeding tray to the resist+the scanning (rotating) time (Ts)+CPM (Ty) of the laterally set recording paper×the number of repeatedly made copies (m−1)=the time (T1) required for the job to finish. Meanwhile, in the case of selection of the fifth paper feeding tray, the transporting time (Tf5) from the fifth paper feeding tray to the resist+CPM (Tt) of the longitudinally set recording paper×the number of repeatedly made copies (m−1)=the time (T5) required for the job to finish.

In this example, when the number of repeatedly made copies is 1 and Ts<(Tf5−Tf1), productivity increases as the laterally set recording paper is fed from the first paper feeding tray with rotation. On the other hand, when Ts>(Tf5−Tf1), the paper feeding from the fifth paper feeding tray without rotation provides higher productivity. When the number of repeatedly made copies is 2 or more, as described before, there may be a possibility that productivity becomes higher as laterally set recording paper is fed from the first paper feeding tray with rotation.

Comparison in Productivity Between Recording Paper Set Longitudinally on First Paper Feeding Tray and Recording Paper Set Laterally on Second Paper Feeding Tray Since the transporting time (Tf1) from the first paper feeding tray to the resist is extremely close to the transporting time (Tf2) from the second paper feeding tray thereto, incorrect parameters (time) such as the difference (Tt−Ty) between CPMs and the scanning (rotating) time (Ts) will make a comparison of productivity difficult.

That is, as is obvious from the above, if not knowing the CPMs of all the recording paper, transporting times on all the paper feeding trays, and scanning times for all the original sizes (which also depends on magnification), it is impossible to determine the paper feeding tray to provide high productivity. Thus, in the first embodiment, a longitudinal-lateral selection is made on the basis of a simplified decision reference (reference value). In other words, selection between the longitudinal recording paper and lateral recording paper (with the rotational operation) is made by a comparison between the number m of repeatedly made copies and the reference value n.

Detailed Calculation Examples of Reference Values

A description will also be made given in terms of calculation examples of the reference value n. In FIG. 2, for a digital copying machine, having five paper feeding trays consisting of a first paper feeding tray 105a, a second paper feeding tray 105b, a third paper feeding tray 105c, a fourth paper feeding tray 105d and a fifth paper feeding tray 105e (which will be referred hereinafter to as 5-tray paper feed), and assuming the following conditions:

A4-recording paper set to be fed longitudinally on the first paper feeding tray;

A4-recording paper set to be fed laterally on the fifth paper feeding tray;

A4-original set longitudinally, 100% magnification;

CPM having 30 in A4 width and 20.1 in A4 length;

Transport time (Tf1) from the first paper feeding tray to the resist+CPM (Tt) of longitudinally set recording paper×the number of repeatedly made copies (m−1)= T1;

Transport time (Tf5) from the fifth paper feeding tray to the resist+scanning (rotating) time (Ts)+CPM (Ty) of laterally set recording paper×the number of repeatedly made copies (m−1)=T2; and $T1 \leq T2$, the number of repeatedly made copies m can be found according to the following equation:

$$Tf1+Tt\ (m-1)=Tf5+Ts+Ty\ (m-1)\ Tt\ (m-1)-Ty\ (m-1)=Tf5+Ts-Tf1$$

$$(Tt-Ty)(m-1)=Tf5+Ts-Tf1 \quad m=(Tf5+Ts-Tf1)/(Tt-Ty)+1 \quad \text{EQUATION (1)}$$

Here, the approximate value of the scanning (rotating) time (Ts) is as follows:

$$\begin{aligned} Ts &= \text{A4 length 294 [mm]/linear velocity} \\ &\quad 150 \text{ [mm/sec]} + \text{leading edge reaching} \\ &\quad \text{time 0.5 [sec]} \\ &= \text{approximately 2.5 [sec]} \end{aligned}$$

CPM (Ty) of laterally set A4 recording paper is:

$$Ty=60/30=\text{approximately 2 [sec]}$$

CPM (Tt) of longitudinally set A4 recording paper is:

$$Tt=60/20.1=\text{approximately 3 [sec]}$$

When substituting Tf4=4 sec, Tf1=1.2 sec, Ts=2.5 sec, Tt=3 sec, and Ty=2 sec into Equation 1), $$m=(4-1.2+2.5)/(3-2)+1=6.3$$

Thus, in the case that the FIG. 2 digital copying machine accommodates the 5-tray paper feed, when the number of repeatedly made copies is above 6.3, that is, when it is 7 or more, selection of the laterally set recording paper (with rotational operation) permits productivity to become high. The number of repeatedly made copies m (m=7) that results in improved productivity concerning the laterally set recording paper is set as the reference value n.

Further, in the FIG. 2 digital copying machine, having four paper feeding trays consisting of a first paper feeding tray 105b, a second paper feeding tray 105c, a third paper feeding tray 105d, and a fourth paper feeding tray 105e (which will be referred hereinafter to as 4-tray paper feed), and assuming the following conditions:

A4-original set longitudinally, 100% magnification;

CPM having 40 in A4 width and 27 in A4 length;

Transport time (Tf1) from the first paper feeding tray to the resist+CPM (Tt) of longitudinally set recording paper×the number of repeatedly made copies (m−1)= T1;

Transport time (Tf4) from the fourth paper feeding tray to the resist+scanning (rotating) time (Ts)+CPM (Ty) of laterally set recording paper×the number of repeatedly made copies (m−1)=T2; and

T1≦T2, the approximate value of the scanning (rotating) time (Ts) is as follows:

$$\begin{aligned} Ts &= \text{A4 length 294 [mm]/linear velocity} \\ &\quad 200 \text{ [mm/sec]} + \text{leading edge reaching} \\ &\quad \text{time 0.25 [sec]} \\ &= \text{approximately 1.7 [sec]} \end{aligned}$$

CPM (Ty) of laterally set A4 recording paper is:

$$Ty=60/40=\text{approximately 1.5 [sec]}$$

CPM (Tt) of longitudinally set A4 recording paper is:

$$Tt=60/27=\text{approximately 2.2 [sec]}$$

From Tf4=3 sec, Tf1=1.4 sec, Ts=1.7 sec, Tt=2.2 sec, and Ty=1.5 sec, $$m=(3-1.4+1.7)/(2.2-1.5)+1=5.7$$

Thus, in the case that the FIG. 2 digital copying machine accepts the 4-tray paper feed, when the number of repeatedly made copies is above 5.7, that is, when it is 6 or more, selection of the laterally set recording paper (with rotational operation) allows productivity to become high. The number of repeatedly made copies m (m=6) that results in the improved productivity on the laterally set recording paper is set as the reference value n.

As described above, according to the first embodiment, selection of the recording paper is made to at least shorten the job finish time independently of whether to perform rotation or not, whereby it is possible to improve productivity.

In addition, the reference value n is always set to be constant independent of the trays of the paper feeding section 105 which contain the recording paper whose set direction is different from that of the original and the recording paper whose set direction is coincident with that of the original, respectively; this can achieve simplification of control.

A second embodiment of the invention, to now be described, having basically the same arrangement as the first embodiment and performing the same operation as the first embodiment, is arranged so as to select and use, as the reference value n, one of two predetermined values on the basis of which of the transport distance of the recording paper different from the original in the set direction and the transport distance of the recording paper coincident with the original in set direction is longer (or shorter).

In the case where the longitudinally set A4 recording paper is placed on the first paper feeding tray and the laterally set A4 recording paper is located on the fifth paper feeding tray as described in the reference value calculation example of the first embodiment, since m=(4−1.2+2.5)/(3−2)+1=6.3, the reference value n is set to 7 for the comparison between the number of repeatedly made copies and the reference value n (always n=7). However, when the laterally set A4 recording paper is placed on the first paper feeding tray and the longitudinally set A4 recording paper is placed on the fifth paper feeding tray, actually m≧(1.2−4+2.5)/(3−2)+1=0.7. This means that rotation will make copying fast. Table 1 shows the transport times (Tf1−Tf5) up to the resists of the respective paper feeding trays when the FIG. 2 digital copying machine adopts 5-tray paper feed and 4-tray paper feed, respectively. In the FIG. 2 digital copying machine, DTf due to the difference between the successive trays is 0.7 sec when adopting the 4-tray paper feed and 0.53 sec when taking the 5-tray paper feed.

TABLE 1

| Paper Feeding Tray | 5-Tray Paper Feed | 4-Tray Paper Feed |
|---|---|---|
| Tf1 | 1.2 s | 1.4 s |
| Tf2 | 1.9 s | 1.93 s |
| Tf3 | 2.6 s | 1.47 s |
| Tf4 | 3.3 s | 3 s |
| Tf5 | 4 s | — |

Thus, due to the relationship between the recording paper to be fed laterally (set laterally) and the recording paper to be fed longitudinally (set longitudinally), a result as shown in Table 2 below is obtainable when the position of the lateral feed vertically differs by "a" trays from the position of the longitudinal feed. Since the vertical relationship between the lateral feed and the longitudinal feed is reversed and hence its difference corresponds to 2 trays, by changing the reference value n in accordance with the vertical relationship, it is possible to select the recording paper on an appropriate paper feeding tray so as to make productivity high. At this time, taking each maximum value (from the Table 2, two values: 2.8 and 6.3 in the 5-tray paper feed, two values: 2.7 and 5.7 in the 4-tray paper feed) prevents productivity from being lowered.

TABLE 2

| Lateral Feed "a" Tray up from Longitudinal Feed | 5-Tray Paper Feed | 4-Tray Paper Feed |
| --- | --- | --- |
| 4 trays | 0.7 | — |
| 3 trays | 1.4 | 1.1 |
| 2 trays | 2.1 | 1.9 |
| 1 tray | 2.8 | 2.7 |
| −1 tray | 4.2 | 3.2 |
| −2 trays | 4.9 | 4.0 |
| −3 trays | 5.8 | 5.7 |
| −4 trays | 6.3 | — |

A third embodiment, basically having the same arrangement and operation as the embodiment 1, retains the Table 2 in the second embodiment as a combinational table in the automatic paper selection section 108 and resets the reference value n every paper feeding tray, thus improving productivity.

A fourth embodiment, in addition to the operations in the first to third embodiments, performs a change of the reference value n according to the sizes of recording paper. For example, in the case that as described in the calculation of the reference value in the first embodiment, longitudinally fed A4 recording paper is placed on the first paper feeding tray and the laterally fed A4 recording paper is located on the fifth paper feeding tray, m=(4−1.2+2.5)/(3−2)+1=6.3. Meanwhile, when both the original and recording paper assume B5 size, Tf5=4 sec, Tf1=1.2 sec, Ts=2.2 sec, Tt=60/23=2.6 sec, and Ty=60/33=1.8 sec, and accordingly m=(4−1.2+2.2)/(2.6−1.8)+1=approximately 6.6. This means that the number of repeatedly made copies m (that is, reference value n), which is the reference, varies in accordance with paper size. Consequently, it is possible to achieve greater improvement of productivity with the reference value n being changed in accordance with the size of recording paper.

A fifth embodiment, in addition to the operations of the first to third embodiments, varies the reference value n in accordance with copy magnification. As described before, in the case of recording onto the longitudinally set A4 recording paper in equal magnification, the scanning (rotating) time (Ts) is:

Ts=A4 length 294 [mm]/linear velocity 150 [mm/sec]+leading edge reaching time 0.5 [sec].

Further, when recording in magnification changes, the leading edge reaching time varies, and hence Ts also varies. For instance, even though a copy is made on the same A4 size recording paper, when reducing A3 Æ A4, the leading edge reaching time of Ts varies as 0.5 (equal magnification) Æ 0.23. Accordingly, the variation of the number of repeatedly made copies m (i.e., the variation of the reference value n) is 0.27, and therefore, when as shown in Table 2, the value n assumes an integer±0.27, the value n becomes an integer, and hence there is a possibility that the value n increases or decreases by 1. As a result, if determining the value n in consideration of changed magnification, it is possible to accomplish greater productivity improvement.

In a sixth embodiment having an arrangement and operation similar to the first embodiment, the automatic paper selection section 108 perform a calculation, on the basis of the number of repeatedly made copies, as to which one of the job-finished time period on recording paper different from the original in the set direction or on recording paper coincident with the original in the set direction is shorter, and on the basis of the calculation result, determines selection of either the recording paper different from the original in the set direction which requires rotation of image information by 90 degrees or selection of the recording paper coincident with the original in the set direction. When rotating the image information by 90 degrees, the section 108 controls the image information rotating means to rotate the image information 90 degrees using the image memory.

More specifically, the respective parameters are determined using the Equation 1) in the first embodiment so as to obtain the reference value n, and then to make a comparison with the number of repeatedly made copies at that time to decide whether or not it is better to rotate the image information (that is, whether to use the laterally set recording paper or use the longitudinally set recording paper). This operation permits greater improvement of productivity.

Here, of the parameters of Equation (1), the leading edge reaching time of Ts which varies only in accordance with the change of magnification, and the values which vary in accordance with the sizes of the recording paper, can be set to be a constant value or a value representing the value to be taken in equal magnification, so that the calculation is effected only using the difference caused by the paper feeding trays.

Figure 5:
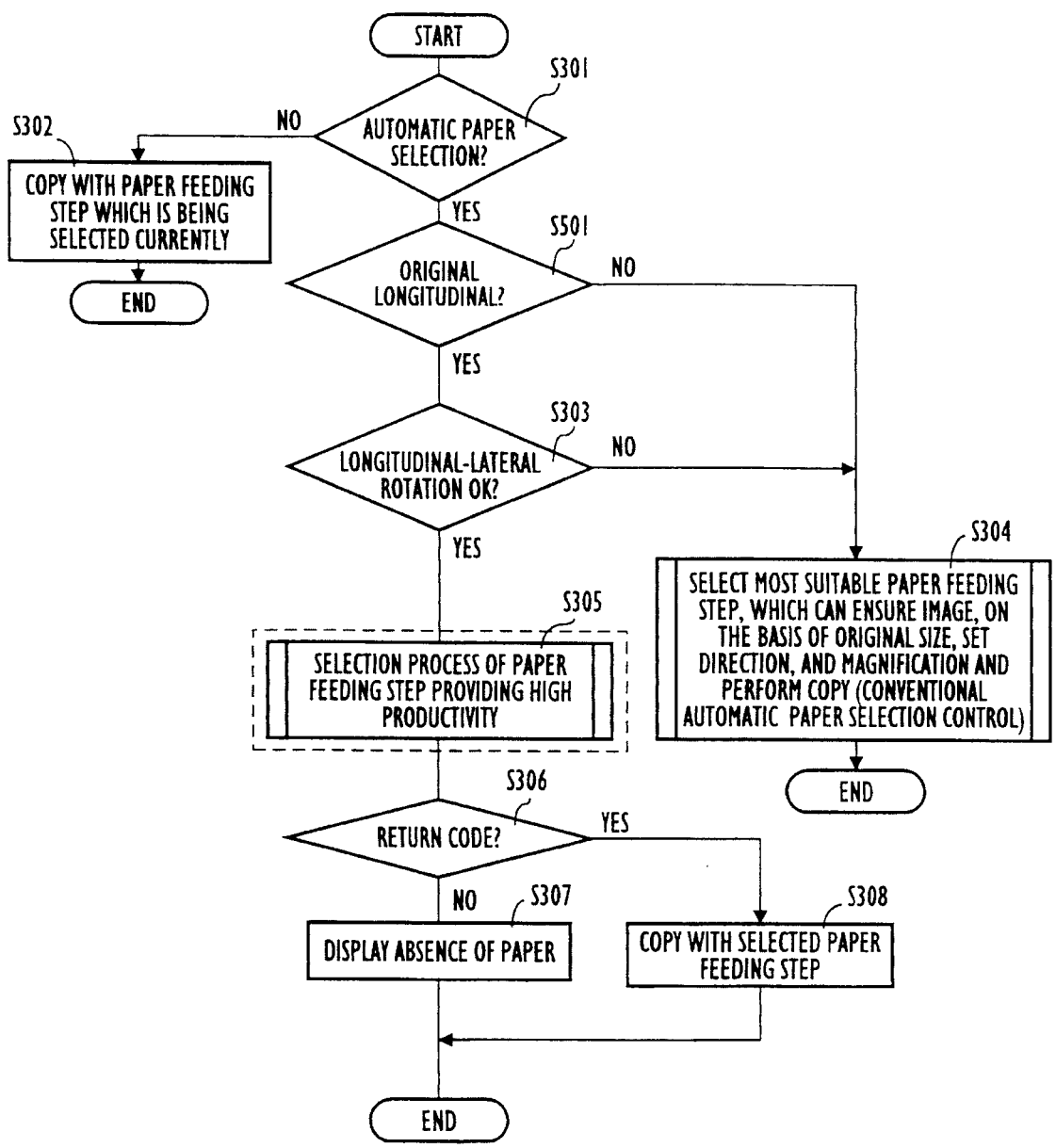
FIG. 5 is a flow chart showing an automatic paper selection process in an automatic paper selection section according to one embodiment.

A seventh embodiment, having the same arrangement as the first embodiment, makes a decision as to whether or not to rotate the image information only when the original is set longitudinally, so as to simplify the control. FIG. 5 illustrates a flow chart of an automatic paper selection process by the automatic paper selection section in the seventh embodiment, which is similar to the FIG. 3 flow chart in the first embodiment except that in step S501 a decision is made in terms of whether or not the original is set longitudinally. Therefore, a detailed description will be omitted.

In a case where the original is fed laterally (set laterally), and when in the 5-tray paper feed the longitudinally set recording paper is placed on the first paper feeding tray and the laterally set recording paper is placed on the fifth paper feeding tray, the following equation is made in setting an A4 Æ A4 copy, for example.

Tf5+Ty (m−1)≧Tf1+Ts+Tt (m−1) (Ty−Tt) (m−1)≧Tf1−Tf5+Ts
m≦(Tf1−Tf5+Ts)/(Ty−Tt)+1 [because of (Ty−Tt) being negative]
m≦(1.2−4+1.9)/(2−3)+1=1.9

Thus, when the number of repeatedly made copies is 1, operation becomes faster. However, this applies to when the paper feeding tray difference is set to a maximum. In most cases (when the paper feeding tray difference is set to values other than the maximum), operation becomes faster as no image rotation is made. Therefore, step S501 is executed to make a decision regarding whether or not to make the rotation only when the original is fed longitudinally, whereby it is possible to simplify control in exchange for a slight lowering of productivity. However, even in this case, improvement of productivity can be achieved as compared with conventional techniques.

We claim:
1. A digital copying machine, comprising:
a scanner for reading image information from an original image;
an image memory for storing digital image data;
an image processing section coupled to said image memory for processing said digital image data;

paper feeding means comprising plural paper trays for storing, respectively, recording paper of various sizes as well as longitudinal and lateral orientations;

an automatic paper selection means that computes a reference value on the basis at least of processing times for at least one prescribed image conversion process in addition to transport time of paper from corresponding trays of said paper feeding means, and, based on the reference number and number of copies to be repetitively made, selects a tray from among said plurality of paper trays; and an image forming means for forming an image corresponding to said digital image data on the recording paper from the selected tray.

2. The digital copying machine of claim 1, wherein said image conversion process includes image size magnification.

3. The digital copying machine of claim 1, wherein said image conversion process includes image rotation, and further wherein certain of said trays contain recording paper oriented in same direction as a preset direction, and at least one other tray contains recording paper having an orientation that is rotated with respect to the preset direction, and said image conversion process comprises rotation of image data stored in said image memory.

4. The digital copying machine of claim 3, wherein said reference value is varied in accordance with image size magnification between original and recorded images.

5. The digital copying machine of claim 1, including a stored combinatorial table based on respective paper trays and paper orientations, accessible by said automatic paper selection means for deriving said reference value.

6. The digital copying machine of claim 4, wherein said reference value is varied in accordance with image size magnification between original and recorded images.

7. The digital copying machine of claim 1, wherein said reference value is varied in accordance with recording paper size.

8. The digital copying machine of claim 1, wherein said reference value is independent of recording paper orientation among said trays.

9. The digital copying machine of claim 1, wherein said reference value has a first value or a second value depending upon transport distance from a tray of recording paper of the preset orientation compared to transport distance from a tray of recording paper of orientation different from the preset orientation.

10. A digital copying machine comprising an automatic paper selection key for designating whether or not to use an automatic paper selection function; operation displaying means for displaying a variety of messages and a variety of key inputs for designations at least on the number of copies to be made repeatedly, a magnification optionally to be changed for copying; original size detecting means for detecting a set direction and size of an original; paper feeding means, having plural paper feeding trays, for feeding recording paper; image reading means for reading image information from said original; image processing means for performing various image processes on said image information read by said image reading means; image forming means for inputting processed image information from said image processing means to form an image on said recording paper; and automatic paper selection means for, when said automatic paper selection function has been selected, determining a recording paper size on the basis of said original size and said magnification and selecting one of said plural paper feeding trays of said paper feeding means on which the most suitable recording paper is placed; an image memory for allowing image information corresponding to more than one sheet of the largest copy-size recording paper to be stored, and image information rotating means for rotating said image information by 90 degrees using said image memory so that, when recording paper of a size determined as a function of said original size and said magnification are present on different trays of said plural paper feeding trays and said recording paper are set longitudinally or set laterally with set direction of the paper being rotated by 90 degrees, said automatic paper selection means, on the basis of a comparison between the number of copies to be made repeatedly and a predetermined reference value, makes a decision either to rotate said image information by 90 degrees and select recording paper whose set direction is different from the set direction of said original, or select recording paper coincident with said original in the set direction, and further control said image information rotating means.

11. A digital copying machine as defined in claim 10, wherein said predetermined reference value is always constant regardless of which trays of said paper feeding means contain the recording paper different from said original in the set direction and the recording paper coincident therewith in the set direction, respectively.

12. A digital copying machine as defined in claim 10, wherein a transport distance of the recording paper different from said original in the set direction is compared with a transport distance of the recording paper coincident therewith in the set direction to select and use one of two predetermined values as said predetermined reference value on the basis of a decision based upon transport distance.

13. A digital copying machine as defined in claim 10, wherein plural values are set as said predetermined reference value on the basis of combinations of the trays of said paper feeding means containing the recording paper different from said original in the set direction and the recording paper coincident therewith in the set direction, respectively, and these plural predetermined reference values are retained as a combinational table.

14. A digital copying machine as defined in claim 10, wherein said predetermined reference value is changed in accordance with the size of said recording paper.

15. A digital copying machine as defined in claim 10, wherein said predetermined reference value is changed in accordance with the magnification for copying.

16. A digital copying machine as defined in claim 10, wherein, when the longitudinal direction of said original coincides with the set direction thereof which is a transported and scanned direction, said automatic paper selection means carries out a selection based on the number of copies to be made repeatedly, and when the lateral direction of said original coincides with the set direction thereof which is said transported and scanned direction, said automatic paper selection means does not perform a selection based on the number of copies to be made repeatedly.

17. A digital copying machine comprising an automatic paper selection key for designating whether or not to use an automatic paper selection function; operation displaying means for displaying a variety of messages and a variety of key inputs at least for designations on the number of copies to be made repeatedly and a magnification to be changed for copying; original size detecting means for detecting a set direction and size of an original; paper feeding means, having plural paper feeding trays, for feeding recording paper; image reading means for reading image information from said original; image processing means for performing various image processes on said image information read by said image reading means; image forming means for inputting processed image information from said image processing means to form an image on said recording paper; and automatic paper selection means for, when said automatic paper selection function has been selected, determining a recording paper size as a function of said original size and said magnification and selecting one of the plural paper feeding trays of said paper feeding means on which the most suitable recording paper is placed; an image memory for allowing image information corresponding to more than one sheet of the largest copy-size recording paper to be stored, and image information rotating means for rotating said image information by 90 degrees using said image memory so that, when recording paper of a size determined on the basis of said original size and said magnification are present on different trays of said plural paper feeding trays and said recording paper are set longitudinally or laterally with the set direction of the paper being rotated by 90 degrees, said automatic paper selection means, on the basis of the number of copies to be made repeatedly, making a calculation regarding which of recording paper different from said original in the set direction and recording paper coincident therewith in the set direction takes a shorter job-finishing time and then, on the basis of the calculation result, determining either selection of said recording paper different from said original in the set direction with said image information being rotated by 90 degrees or selection of said recording paper coincident therewith in the set direction, and further controlling said image information rotating means.

18. A digital copying machine, comprising:

a scanner for reading image information from an original image;

an image memory for storing digital image data;

an image processing section coupled to said image memory for processing said digital image data;

paper feeding means comprising plural paper trays for storing, at different positions, respectively, recording paper of various sizes as well as longitudinal and lateral orientations, each tray having a transport distance associated therewith;

an automatic paper selection means that computes a reference value on the basis at least of transport distances of paper from corresponding trays of said paper feeding means, and, based on the reference value and number of copies to be repetitively made, selects a tray from among said plurality of paper trays and wherein said image processing section rotates said digital image data in the case of an original having longitudinal orientation and when copying to recording paper having lateral orientation is selected by said selection means; and an image forming means for forming an image corresponding to said digital image data on recording paper from the selected tray.

19. The digital copying machine of claim 18, wherein said trays are vertically stacked.

20. A digital copying machine, comprising:

a scanner for reading image information from an original image;

an image memory for storing digital image data;

an image processing section coupled to said image memory for processing said digital image data;

paper feeding means comprising plural paper trays for storing, at different positions, respectively, recording paper of various sizes as well as longitudinal and lateral orientations, each tray having a transport distance associated therewith;

an automatic paper selection means that computes a reference value on the basis at least of the size of recording paper on which an image is to be copied, and, based on the reference value and number of copies to be repetitively made, selects a tray from among said plurality of paper trays and wherein said image processing section rotates said digital image data in the case of an original having longitudinal orientation and when copying to recording paper having lateral orientation is selected by said selection means; and an image forming means for forming an image corresponding to said digital image data on recording paper from the selected tray.

21. A digital copying machine, comprising:

a scanner for reading image information from an original image;

an image memory for storing digital image data;

an image processing section coupled to said image memory for processing said digital image data;

paper feeding means comprising plural paper trays for storing, at different positions, respectively, recording paper of various sizes as well as longitudinal and lateral orientations, each tray having a transport distance associated therewith;

an automatic paper selection means that computes a reference value on the basis at least of size magnification between an image on an original sheet and an image copied to a recording sheet, and, based on the reference value and number of copies to be repetitively made, selects a tray from among said plurality of paper trays and wherein said image processing section rotates said digital image data in the case of an original having longitudinal orientation and when copying to recording paper having lateral orientation is selected by said selection means; and an image forming means for forming an image corresponding to said digital image data on recording paper from the selected tray.

22. A digital copying machine, comprising:

a scanner for reading image information from an original image;

an image memory for storing digital image data;

an image processing section coupled to said image memory for processing said digital image data, including rotation of stored digital image data;

paper feeding means comprising plural paper trays for storing, at different positions, respectively, recording paper of various sizes as well as longitudinal and lateral orientations, each tray having a transport distance associated therewith;

an automatic paper selection means that, based on the number of copies to be repetitively made, selects a tray from among said plurality of paper trays, and wherein said image processing section rotates said digital image data in the case of an original having longitudinal orientation and when copying to recording paper having lateral orientation is selected by said selection means; and an image forming means for forming an image corresponding to said digital image data on recording paper from the selected tray.

23. A digital copying machine, comprising:

a scanner for reading image information from an original image;

an image memory for storing digital image data;

an image processing section coupled to said image memory for processing said digital image data, including rotation of stored digital image data;

paper feeding means comprising plural paper trays for storing, at different positions, respectively, recording paper of various sizes as well as longitudinal and lateral orientations, each tray having a transport distance associated therewith;

an automatic paper selection means that, only when the original has a longitudinal orientation, selects a tray from among said plurality of paper trays, and wherein said image processing section rotates said digital image data when copying to recording paper having lateral orientation is selected by said selection means; and an image forming means for forming an image corresponding to said digital image data on recording paper from the selected tray.

* * * * *